March 11, 1941.

L. H. PECK 2,234,604

MOLDING APPARATUS

Filed June 3, 1937

INVENTOR
LEE H. PECK
BY
Brackett, Hyde, Higley & Meyer
ATTORNEYS

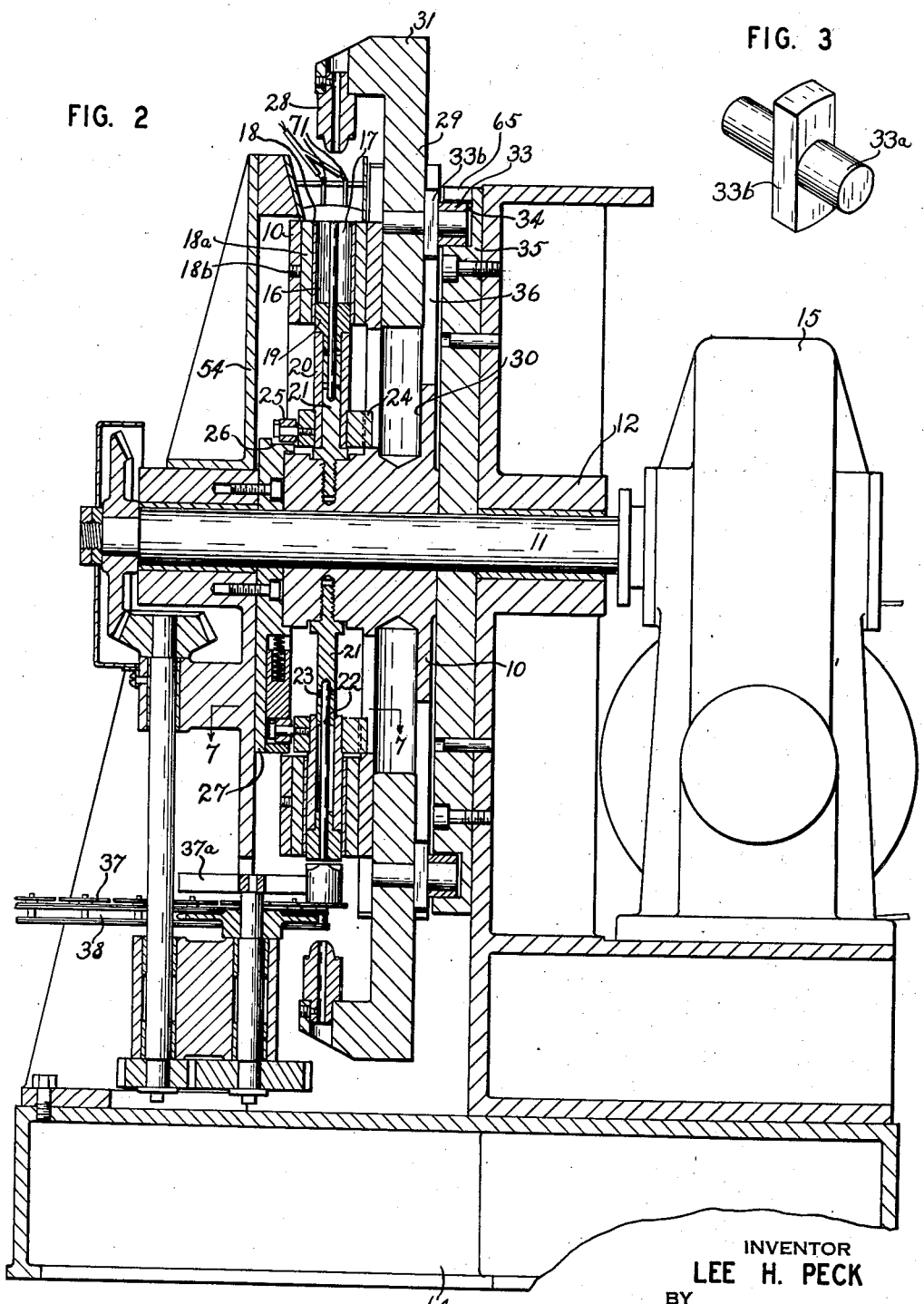

March 11, 1941. L. H. PECK 2,234,604
MOLDING APPARATUS
Filed June 3, 1937 5 Sheets-Sheet 3

INVENTOR
LEE H. PECK
BY
ATTORNEYS

March 11, 1941.    L. H. PECK    2,234,604
MOLDING APPARATUS
Filed June 3, 1937    5 Sheets-Sheet 4

INVENTOR
LEE H. PECK
BY
Brockett, Hyde, Higley & Meyer
ATTORNEYS

March 11, 1941.   L. H. PECK   2,234,604
MOLDING APPARATUS
Filed June 3, 1937
5 Sheets-Sheet 5
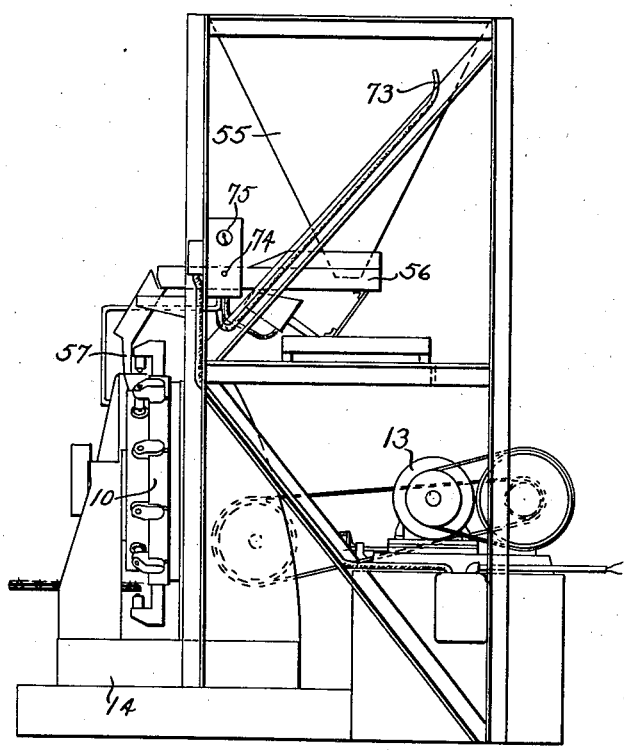
FIG. 13
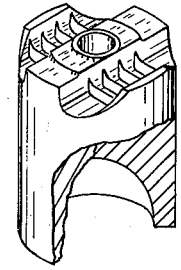
FIG. 11
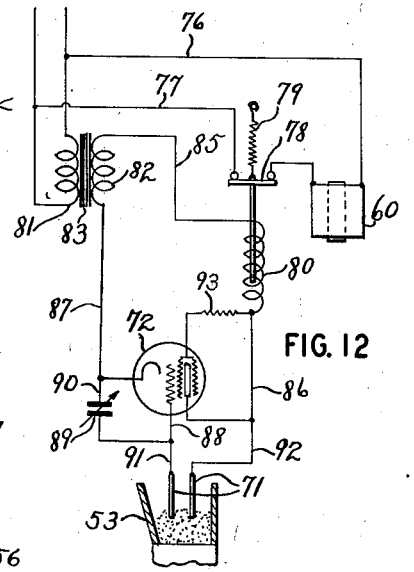
FIG. 12
FIG. 14
FIG. 15
INVENTOR
LEE H. PECK
BY
Brockett, Hyde, Higley & Meyer
ATTORNEYS Patented Mar. 11, 1941

2,234,604

UNITED STATES PATENT OFFICE 2,234,604

MOLDING APPARATUS

Lee H. Peck, Chagrin Falls, Ohio, assignor to Porcelain Products, Inc., Findlay, Ohio, a corporation of Delaware Application June 3, 1937, Serial No. 146,134

8 Claims. (Cl. 25—78)

This invention relates to improvements in apparatus for molding articles by the compression of loose material. My invention is particularly adapted for the production of porcelain insulators and like articles which are formed by compressing suitable mixtures of clay, flint, whiting and similar materials in a mold.

My invention provides novel apparatus in which a recessed mold is carried by a rotating turret, the mold being subjected during turret rotation to a loading or filling operation, a compressing operation and an ejecting operation. Various features of my invention are directed to novel apparatus for loading the molds and for producing the compression of the loose material to form a molded article, and novel apparatus for ejecting or discharging the article after it is molded.

My invention provides novel apparatus for cleaning and preparing each mold before it is filled, for sizing the loose material before it enters the molds, for insuring that each mold receives an exactly measured amount of the loose material, for providing the same compression for the material in each loaded mold, and for giving each piece the same treatment during ejection from the mold so as to produce uniform molded articles.

Among other novel features of my invention are the provision of apparatus whereby the molded article is formed in a recessed mold and is held under compression while being removed from the mold to prevent cracks in the article.

Another feature of my invention is the provision of novel apparatus for freeing the molded article from the molding machine at the close of the ejecting portion of the cycle.

My novel apparatus is arranged with carefully designed clearances between the compression dies and the walls of the mold recess so as to permit air to escape from the mold when the loose material is compressed, thus avoiding both the formation of fins of excess material at these points and at the same time avoiding air pockets in the molded articles. The mold liner and the compression die surfaces are so constructed that, upon wear increasing the clearance between them, they are quickly and cheaply restored to original condition.

My invention also comprises novel arrangements for cleaning and spraying the molds and various details of structure pointed out in the specification and disclosed in the drawings and the essential features of which will be summarized in the claims.

In the drawings—

Fig. 1 is an end view of the machine taken at the left of Fig. 2, parts of the turret being broken away to show the progressive steps in compressing a molded article;

Fig. 2 is a central longitudinal section along the line 2—2 of Fig. 1;

Fig. 3 is a detailed perspective view of the part 33a of Fig. 2;

Fig. 11 is a perspective view of an article adapted to be molded by the machine;

Fig. 12 is a wiring diagram of mechanism for controlling the level of material in the feed trough;

Fig. 13 is a side elevation of the machine with drive and material supply apparatus;

Fig. 14 is a detail sectional view of a portion of the material supply apparatus; while Fig. 15 is a top plan view of an end of the feed trough.

Figure 4:
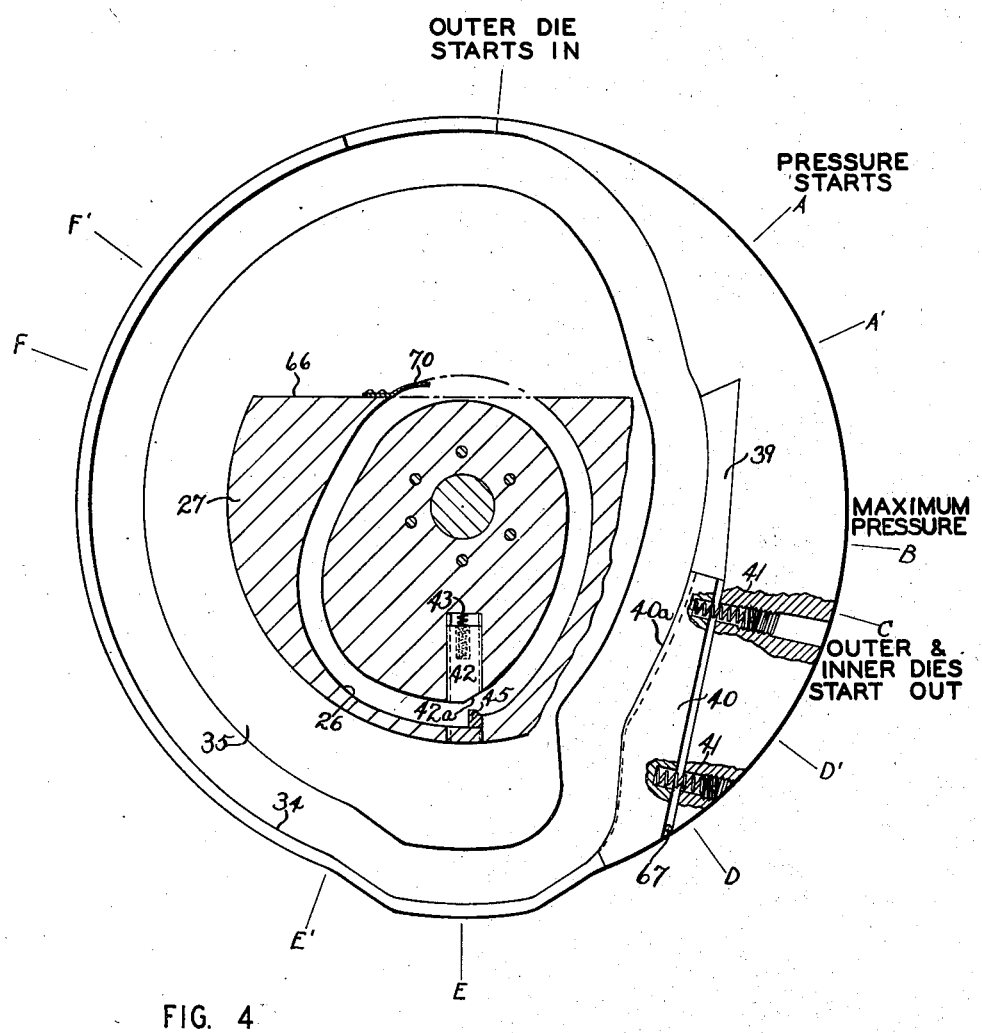
Fig. 4 is a partial vertical sectional view through the inner die controlling cam plate 21 superimposed on an elevation of the outer die controlling cam plate 35 so as to form a diagram illustrating the relative movements of inner and outer dies.

I have shown my invention as applied to a machine for producing porcelain insulators of the general character illustrated in Fig. 11 having a generally cylindrical form with a cored hole in the center for receiving a nail or other securing member. This particular type of insulator has a recessed bottom and wire receiving grooves in the top as shown. It will be understood, however, that my invention is applicable to the production of other types of molded articles. Certain features of my invention are applicable to apparatus comprising a single mold or a small number of molds, but to increase the efficiency and production of my apparatus I show a number of molds, for instance ten, carried by a rotating turret, the succession of operations being carried out on each mold as it passes through a certain portion of its path of travel. It will be obvious that the number of molds may be arranged to suit individual conditions.

In the present embodiment a turret 10 is mounted on a substantially horizontal shaft 11 journalled in the frame 12 for rotation in a vertical plane. While the rotation of this turret may be provided for in a number of different ways, I have illustrated a continuously rotated turret driven by a motor 13 mounted upon a suitable base and acting through a variable speed drive which is belt connected to reduction gearing 15. The turret here illustrated is adapted to be run at the speed of 20 R. P. M. or thereabouts.

The turret is provided with a plurality of recessed molds 16, in the present instance ten, having openings 17 at the periphery of the turret. In the present instance the molds open toward the outer periphery of the turret. The mold recesses here shown are formed in the turret proper and are provided with mold linings 18, thus giving accurate diameter to the mold and providing for replacement of the linings when worn. To this end the lining is carried by a sleeve 18a positioned in the turret by set screw 18b. Opposite the opening of each mold and forming the bottom wall thereof is an inner die 19 which carries rigid with it a radially inwardly extending sleeve 20 adapted to slide upon a pin 21 which is rigidly fixed in the hub of the turret. The pin 21 also carries the core pin 22 for forming the central opening in the porcelain insulator, this pin being fastened in place in any suitable manner as by the fastening 23 shown. Rigidly secured to the sleeve is the block 24 which carries the cam follower 25 for coaction with a suitable cam 26 for controlling the movement of the inner dies. The block 24 has a lug 24a which enters a suitable radial slot in turret 10 to guide the movement of sleeve 20 and die 19. In the present embodiment the cam is a groove formed in plate 27 secured in a stationary manner to the frame on the outer face of the turret. The followers 25, one for each inner die, comprise rollers which travel in the groove of the cam. As will be later explained the formation of this cam is such that the inner die forms a stationary bottom wall for the mold from the point where the mold is filled at the top of its path and for its travel through substantially 105° during which time the loose material in the mold is compressed. Thereafter the cam causes outward movement of the inner die for ejecting the molded article.

Referring to Figs. 1 and 2, the sleeve 20 extends $\frac{1}{32}$" radially inwardly beyond the block 24 so that it is the end of the sleeve which engages the shoulder 21a on pin 21 during the travel of the inner die controlling cam from the point F' in Fig. 4 to the point C. In other words, during the time that compression occurs in the mold chamber, the cam rollers 25 clear the cam track 26 by $\frac{1}{32}$" and the reaction to the compressing operation is all absorbed between sleeve 20 and the shoulder 21a.

A series of outer dies 28 is provided, one for each mold, these dies being adapted to enter the openings in the recessed molds and to compress the loose material therein. These outer dies are preferably reciprocably mounted in the turret, the dies having stems 29 entering guiding openings 30 in the turret for this purpose.

Each die carries a head portion 31 having faces 31a which engage snugly in a guiding slot 32 formed radially in the turret and bevelled surfaces 32a on the turret insure centering of the outer die in the mold opening before compression starts. The faces 31a coact with slot 32 in absorbing any side thrust developed in the compression operation and holding the outer dies properly indexed at all times with reference to the mold recess. Each of these outer dies carries rigidly secured thereto by a pin or shaft 33a a follower roller 33 adapted to engage in the groove 34 of a cam plate 35 secured to the frame on the inner face of the turret. A portion 33b of roller shaft 33a (Fig. 3) engages a slot 36 in the turret and helps guide the die.

The arrangement between this cam plate 35 and the outer dies is such that the dies are in fully withdrawn position when at the top of their path where the molds are loaded with loose material. As the mold rotates from this position, each die is rapidly moved inwardly until it engages the material in the mold at substantially the point A (Fig. 4). During the next portion of mold travel the outer die is moved inwardly to provide very heavy pressure compressing the loose material in the mold recess to substantially half of its original volume. This action is substantially completed at the point B and this pressure is held for an additional 10° until the point C is reached.

From the point C as the mold moves downwardly both inner and outer dies move outwardly carrying the molded article out of the mold recess until at the point D the outer die is rapidly moved outwardly to its outermost position leaving the molded article unsupported. From the point D to the point E the inner die continues to move outwardly and at the point E the molded article is finally released from the turret and drops under the influence of gravity a very short distance onto one of the rotatable disks 37 carried by the conveyor chain 38 which carries the molded articles to the next processing step, which in the present instance is passage through a drying kiln. Rotating vanes 37a steady each piece as it drops to the conveyor.

Preferably a hardened steel block 39 is provided forming the follower engaging surface of the outer die controlling cam between points A' and C where the greatest compression is developed. This may amount to as much as 2500 pounds per square inch in the type of machine described.

I find that in removing the molded article from the mold recess the article is likely to develop cracks when the outer die is withdrawn, either because the molded article sticks to the outer die or because a vacuum is formed in the cylindrical portion of the mold recess as the outer die is withdrawn, or possibly due to a combination of both of these. To avoid the formation of such cracks I prefer to hold the molded article under compression while moving it out of the mold recess, at least during that portion of the ejection period when the molded article is first started outwardly of the recess. To this end I provide a backing block 40 for that portion of the outer die controlling cam groove between the points C and D. This block is preferably of hardened steel of the form shown, slidably mounted in a portion of the turret and yieldingly held in the position indicated in full lines in Fig. 4 by the springs 41 shown. The free space outwardly of the block permits movement of the block outward as indicated in broken lines in Fig. 4. As shown in Fig. 4 a hardened steel pin 67 carried by the cam plate rests between the outer end of block 40 and the cam surface behind it so as to give a tilting movement of block 40 about its outer edge. The formation of the cam surface 40a of this block is such that as the mold passes the point C and the inner die commences to move outwardly (controlled by its cam), the cam follower of the outer die is constrained to move slightly inwardly if the block lies in its full line position of Fig. 4. It results from this construction that as the parts pass the point C the inner die presses on the bottom of the molded article but the outer die constrained by the cam portion 40a exerts the pressure of the springs 41 against the outer surface of the molded article so that it is held under compression until the point $D_1$ is reached and from this point to the point D the cam portion 40a is so formed that this yielding pressure is gradually reduced. By adjustment of the tension of springs 41 the pressure on the molded articles during removal from the mold is varied and this exerts a great effect upon the surface of the finished article. During the travel from C to D both inner and outer dies are moving outwardly so that the molded article is moved through a major portion of its ejecting phase by the time the point D is reached. At this point the outer die is rapidly moved outwardly as previously described to relieve all pressure on the molded article so as not to bulge or distort it. The inner die continues to push the piece outwardly until it reaches the bottommost point in its path of travel.

Figure 6:
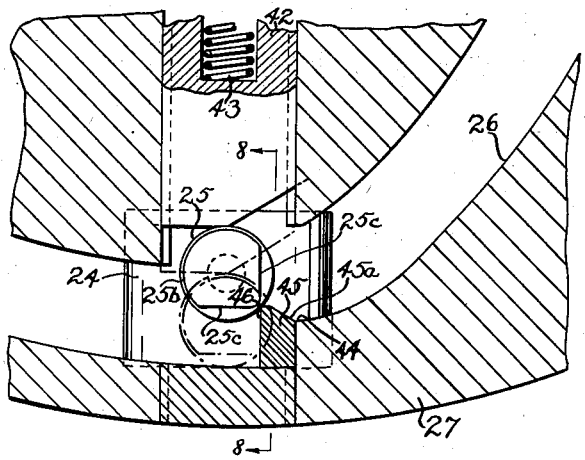
Fig. 6 is a detail sectional view along the line 6—6 of Fig. 8 showing the article ejecting mechanism at the bottom of the turret.
Figure 7:
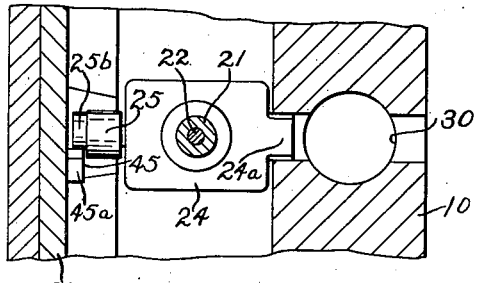
Fig. 7 is a detail sectional view along the lines 7—7 of Figs. 1 and 8.
Figure 8:
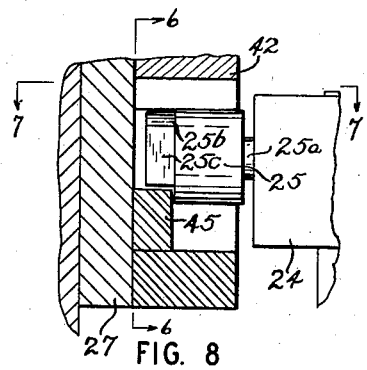
Fig. 8 is a detail sectional view along the line 8—8 of Fig. 6.

Special apparatus is provided for finally freeing the molded article from the turret apparatus at the point of ejectment. This as best seen in Fig. 4 comprises a plunger 42 having an inclined face 42a adapted to engage the roller followers 25 controlling the movement of the inner dies 19. This plunger is mounted for reciprocation in a dovetailed recess in the cam and urged outwardly by the spring 43. The inclined face of the plunger normally lies in the path of the upper portion of the cam follower roller as it reaches the bottom of its path of travel. At the point 44 the cam groove 26 is cut away sharply, thus removing all support for the cam follower roller at this point. As best seen in Figs. 6 and 8, the pin 25a which supports cam follower roller 25 has a round head 25b which is $\frac{1}{32}''$ less in diameter than the roller 25. The head of this pin is flattened on two sides as at 25c at distances $\frac{1}{4}''$ from the center of the pin. A hardened steel block 45 having a bevelled entrance end 45a is inserted at the back of the cam track 26. As the roller 25 travels along the surface 26 the shoulder 25c on the pin has $\frac{1}{32}''$ clearance from the block 45. As the roller 25 drops off the shoulder 44 the surfaces 25c and 45 engage. Meanwhile as the turret continues to rotate, the cam follower roller urges the plunger upwardly compressing the spring 43, and as the shoulder 25c on the follower pin clears the stationary shoulder 46, the spring pressed plunger kicks the inner die outwardly a short distance, thus freeing the molded article from the inner die and permitting it to drop the short distance to the conveyor.

Means is provided for cleaning the dies on the return travel indicated by the left half of Figs. 1 and 4. For instance, a blast of air might be used and the rotary brush 47, driven by motor 47a, is provided to clean the face of the inner die while it is still in its extended position, and the face of the outer die at the same time.

Figure 9:
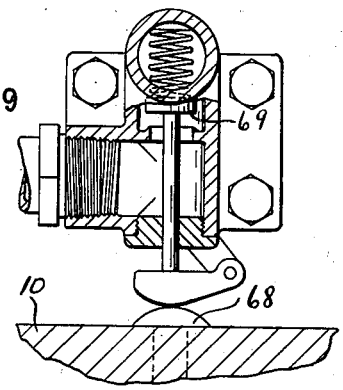
Fig. 9 is a fragmental sectional view along the line 9—9 of Fig. 1.

Means is provided also for coating the interior of the mold recess and the faces of the outer and inner dies preparatory to another molding operation. A suitable material for this purpose is a mixture of paraffine oils and kerosene. However, there are other materials which might be used at this point. In the apparatus shown, a reservoir 48 of oil is provided under air pressure supplied from the pressure conduit 49 and oil is directed into the mold recess and against the face of the inner die by conduit 50 and against the face of the outer die by conduit 51. This same oil under pressure may be conducted by suitable conduits 52 to other points on the apparatus needing lubrication. Control buttons 68 on the face of the turret operate a control valve 69 as shown in Fig. 9 so as to control the discharge of oil vapor through the outlets 50 and 51.

A similar valve operated by these same buttons 68 may be utilized to release a blast of air at each die 28 and die guiding stem 29 after the mold is filled and before the outer die begins to compress the material. This insures a clean die stem 29 where it enters the turret on its inward stroke.

The outer die remains in its outermost position as shown from the point E' and throughout about 180° of travel until it again passes its uppermost position except for a slight dip near the point E where the outer die passes beneath the conveyer. The inner die after it passes the rotary brush is withdrawn by its controlling cam to its innermost position at the point F and remains in this position until it again passes the point C. Referring to Figs. 1 and 4, a leaf spring 70 is fastened to the upper edge of cam plate 27 in position to engage the rollers 25 as they pass that point and insure that sleeve 20 is in engagement with the shoulder 21a, thus insuring the lowest position of die 19 at the time the mold is filled and insuring a uniform filling of the mold.

Preferably means is provided for automatically filling each mold recess without stopping turret rotation. To this end closely engaging the upper arcuate surface of the turret is a feed trough 53 or loose material reservoir which may be formed of sheet metal and supported by the arms 54 from the hub of the turret. Material from the hopper 55 drops onto the shaker feeder 56 and thence passes through the chute 57 to the feed trough or reservoir. If necessary or desirable a screen 58 may be provided above the shaker feeder to insure proper sizing of material before passing into the shaker feeder. The tailings from this screen may be led away by means of a tailing chute 59. The shaker feeder is of a well known type operated by a solenoid coil 60 as illustrated but other suitable feeding means might be provided. As the turret moves in the direction of the arrow I provide within the reservoir a V-shaped scraper member 61 for folding the loose material from each side inwardly and for scraping the top of the mold recess as it passes out of the filling trough.

I have provided interlock means for controlling the feeding apparatus in accordance with the level of the material in the feed trough. One of the purposes of this interlock means is to prevent the feed trough running over. Another purpose of the interlock means is to maintain a substantially constant level of the loose material in the feed trough. The density of the molded pieces varies with the level of the material in the trough 53. Therefore uniform density is insured by maintaining a constant level at a predetermined height. Also the density may be varied by a variation of the height of material in the feed trough. Various mechanisms may be provided for this purpose but the preferred form is the one illustrated herewith which does not disturb the loose material in the trough to any appreciable degree. I find that disturbance of material in the trough results in a segregation of the larger particles which is a disadvantage.

As shown in Figs. 1, 2 and 12, in the feed trough 53 I place a pair of condenser plates 71 which are arranged in circuit with a vacuum tube 72 so as to interrupt the operation of the shaker feeder 56 in accordance with the level of material in the trough 53. The shaker feeder is operated by a solenoid coil 60 acting on an armature secured to the feeder and supplied with current from a source 73 controlled by button 74 and including a variable resistance controlled at 75 so as to vary the shaking action of the solenoid 60. The supply circuit for solenoid 60 as shown in Fig. 12 includes lines 76 and 77 connected to two sides of the source of electrical supply and having an interrupting switch 78 normally held closed as by a spring 79 and adapted to be opened upon energization of relay 80. The control circuit by which the level of material in trough 53 affects switch 78 is clearly shown in Fig. 12. The primary 81 of a transformer is connected to the electrical source and the secondary is shown at 82 with a core 83. The relay 80 is connected by line 85 with the transformer secondary and by line 86 with the anode of tube 72. The cathode of the tube is connected by line 87 with the secondary of the transformer 82. The grid of the tube 72 is connected by line 88, variable condenser 89 and line 90 with line 87. The condenser 71 is connected by lines 91 and 92 with lines 88 and 86 respectively. The tube shield is connected through resistance 93 with line 86. The variable condenser 89 is provided for tuning the circuit so that under the normal selected conditions relay 80 will have no current flow, switch 78 will be closed and the solenoid 60 will operate. This condition may be selected so that the material in trough 53 is below the plates 71 or at some predetermined position on those plates. With the above described circuit and material being fed through the shaker feeder, it is obvious that the feeder will normally operate until the loose material rises to such a point on plates 71 that the capacitance of the circuit is changed, causing a flow through tube 72 and the energization of relay 80 thus opening the switch 78 and causing the shaker feeder to stop until the loose material in trough 53 has subsided to its predetermined normal level, at which time switch 78 will again close and the shaker feeder will operate.

While it will be understood from the drawings that the control cams for the inner and outer dies are on opposite sides of the rotating turret in this particular embodiment, there is no reason why they could not both be placed upon one side of the turret and for simplicity of illustrating their interaction the diagram of Fig. 4 shows the two cam grooves one within the other.

The cam plate 35 for the outer dies is cut away at the top as shown at 65 permitting the easy removal of the dies at this point. The cam plate 27 for the inner dies is cut away at 66 as shown so that the dies are easily removed at this point, no outer controlling cam surface being necessary at this place.

Figure 5:
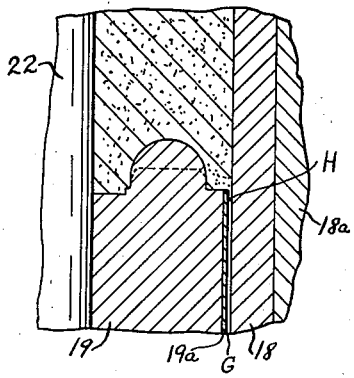
Fig. 5 is an enlarged and distorted view of a portion of an inner die engaging the compressed material and illustrating the clearance between the die and mold liner.

Referring to Fig. 5, exit of air from the mold cavities is only by way of clearance between the dies 19 and 28 and the mold wall 18. The quantity of air trapped in the mold cavity will be less if the filling material is properly graded and screened and free of large lumps, and will be less if the mold cavity is entirely filled before compression starts. Vice versa, the amount of trapped air will be greater if the material is not carefully graded or contains large lumps, or if the mold cavity is not well filled.

Unless the trapped air can escape from the mold cavity, the surface of the formed articles will be rough and uneven due to the formation of air bubbles at the confining surfaces and the density of the formed pieces will vary because of the entrapment of air pockets in the finished piece.

To insure sufficient clearance for the discharge of entrapped air, I find it desirable to provide a clearance at point G between dies 19 and 28 and the mold liner 18 of approximately .0025 of an inch all round when the dies are new. This is for forming the article shown, which is of approximately 1¼" diameter and may vary, of course, under other circumstances and with other articles or other molding substances. When, during the use of the machine, this clearance approaches .006 of an inch, the clay material is likely to enter this clearance space as shown at H, causing improperly formed articles and undesirable wear of the die and mold walls. Therefore I prefer to renew the parts when the wear reaches this point.

I find very satisfactory working conditions are provided when the dies 19 and 28 are chromium plated as at 19a and the mold liner 18 is of hardened steel. When the dies become worn, it is only necessary to strip the remainder of the chromium plating from them, replate them with chromium and grind the dies to size.

Figure 10:
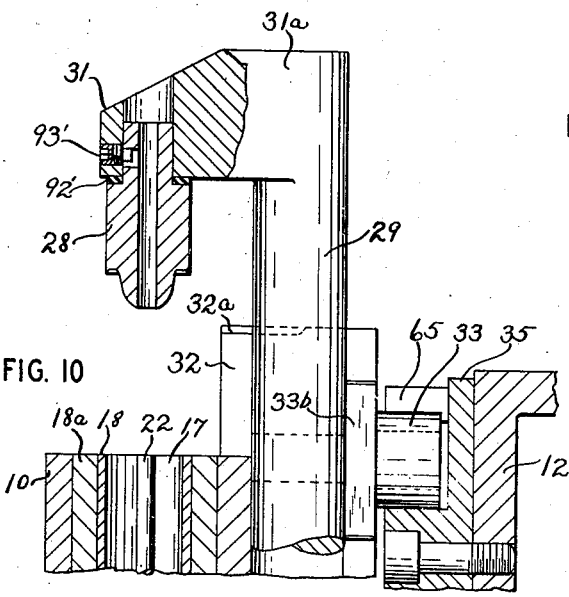
Fig. 10 is a fragmental sectional view showing a modified mounting for the outer die.

Referring to Fig. 10, another method of insuring a yielding pressure against the molded articles while they are being stripped from the mold is to insert a rubber gasket (or a spring mounting) at 92' between the die 28 and its supporting member 31. A pin 93' supports the die 28 while permitting compression of the rubber. The gasket 92' is fully compressed by the time point B or C is reached. Then the outer die is moved outwardly more rapidly than the inner die and the compression of the rubber relieved at any rate desired until the point D is reached, when it is zero. In such a device the block 40 is not needed.

Pieces of satisfactory surface formation and of uniform density are obtained only by proper preparation of the molds, by a careful control of clay composition, clay moisture, clay sizing, uniform filling of the mold cavity, uniform compression of the loose material, adjustment of the compression during ejection, and care of the clearance G. My improved machine places all of these under automatic control with adjustability at the various points as specified so that uniform articles may be produced.

What I claim is:

1. In apparatus for molding articles by compressing loose material, a plurality of movable molds open at the top, a feed trough for loose material beneath which said molds pass, whereby said molds are filled by said material falling by gravity into said molds, and means for maintaining said loose material at substantially a constant level in said trough over a filling mold.

2. In apparatus for molding articles by compressing loose material, a plurality of molds in a mold carrier, dies adapted to compress the material in said molds, means for moving one of said dies to eject compressed material from its associated mold, and means for tapping said one die after it has made a portion of its ejecting movement, to release the compressed material.

3. In apparatus for molding articles by compressing loose material, a plurality of molds in a mold carrier, dies adapted to compress material in said molds, said carrier being arranged to move said molds to a point of ejectment, one of said dies being an ejecting die for removing compressed material from the molds, a spring-pressed plunger arranged to coact with each ejecting die at said ejecting point, a cam track for guiding said ejecting die to load said plunger spring as the ejecting die approaches the ejecting point, and said cam track being arranged to suddenly release said die to the action of said plunger.

4. In molding apparatus of the class described, a mold open at opposite ends, an ejecting die adapted to close one end of said mold, a compressing die adapted to enter the other end of said mold, means including a cam track having a rigidly held compressing portion for moving said compressing die in a direction to compress loose material in said mold against said other die, means for moving both of said dies simultaneously at substantially the same speed in an opposite direction to eject said compressed material from said mold, and said last named means including said cam track controlling said compressing die, said track having a yielding portion located beyond the compressing portion thereof and yieldingly holding said compressing die during at least the first portion of said movement in said opposite direction.

5. The combination of claim 4 in which said last named cam track portion is a separate elongated member pivoted at its end nearer the point of ejection of said compressed material.

6. The combination of claim 4 wherein said yielding track portion is held in position by springs, and including means for adjusting the tension on said springs.

7. In apparatus for molding articles by compressing loose material, a rotatable turret, there being a plurality of mold recesses radially positioned in said turret and open at their inner and outer ends, dies adapted to enter said inner and outer ends respectively, means for moving said outer die into said mold during a portion of the turret rotating cycle for compressing loose material in said mold, a stationary cam for controlling said inner die, a follower on said inner die for engagement with said cam, support means for said inner die rigid with said turret and independent of said cam and follower, said support means being so arranged as to be effective during said material compressing portion of the turret cycle, and said cam and follower being arranged to move said inner die for ejecting the formed article from the mold recess during another portion of the turret rotating cycle.

8. In apparatus for molding articles by compressing loose material, a rotatable turret, a plurality of recessed molds carried by said turret and opening radially outwardly toward the periphery of said turret, a radially inner die forming the bottom of each mold, a radially outer die for each mold carried by said turret and adapted to enter said opening, means for rotating said turret, means for causing during turret rotation inward movement of each outer die to compress material in the recess of its associated mold then outward movement of said outer die to permit ejectment of compressed material from said mold, a spring-pressed member operatively associated with each inner die and stressed in a direction to cause radially outward die movement as each mold approaches ejecting position, and means for suddenly releasing said member as each mold reaches ejecting position.

LEE H. PECK.